(12) United States Patent
Aksit et al.

(10) Patent No.: US 10,317,678 B2
(45) Date of Patent: Jun. 11, 2019

(54) CATADIOPTRIC ON-AXIS VIRTUAL/AUGMENTED REALITY GLASSES SYSTEM AND METHOD

(71) Applicant: NVIDIA Corporation, Santa Clara, CA (US)

(72) Inventors: Kaan Aksit, Mountain View, CA (US); David Patrick Luebke, Charlottesville, VA (US)

(73) Assignee: NVIDIA Corporation, Santa Clara, CA (US)

( * ) Notice: Subject to any disclaimer, the term of this patent is extended or adjusted under 35 U.S.C. 154(b) by 121 days.

(21) Appl. No.: 15/426,984

(22) Filed: Feb. 7, 2017

(65) Prior Publication Data

US 2017/0227773 A1    Aug. 10, 2017

Related U.S. Application Data

(60) Provisional application No. 62/292,805, filed on Feb. 8, 2016.

(51) Int. Cl.
| | |
|---|---|
| *G02B 26/02* | (2006.01) |
| *G02B 27/01* | (2006.01) |
| *H04N 9/31* | (2006.01) |
| *G02B 5/02* | (2006.01) |
| *G02B 27/28* | (2006.01) |
| *G02B 5/30* | (2006.01) |

(52) U.S. Cl.
CPC ....... *G02B 27/0172* (2013.01); *G02B 5/0263* (2013.01); *G02B 5/3083* (2013.01);
(Continued)

(58) Field of Classification Search
CPC .............. G02B 27/0172; G02B 5/3083; G02B 26/023; G02B 5/0263; G02B 27/28;
(Continued)

(56) References Cited

U.S. PATENT DOCUMENTS

| | | | |
|---|---|---|---|
| 2015/0205107 A1* | 7/2015 | Border | G02B 27/0172 345/8 |
| 2017/0068029 A1* | 3/2017 | Yun | B29D 11/00644 |
| 2017/0227770 A1* | 8/2017 | Carollo | G02B 27/0172 |

OTHER PUBLICATIONS

Maimone et al., "Pinlight displays: wide field of view augmented reality eyeglasses using defocused point light sources," ACM Transactions on Graphics, vol. 33, No. 4, Jul. 2014, pp. 1-11.
(Continued)

*Primary Examiner* — William R Alexander
*Assistant Examiner* — Henry A Duong
(74) *Attorney, Agent, or Firm* — Leydig, Voit & Mayer, Ltd.

(57) ABSTRACT

A method and system for operating a catadioptric glasses system is presented. The method includes the steps of generating an image via a light engine included in a glasses system and projecting the image onto a display that includes a diffusion layer positioned between a curved mirror and a user's retina. Light emitted from a surface of the diffusion layer is reflected off the curved mirror to the user's retina through the diffusion layer, and the diffusion layer is located between a focal point of the curved mirror and a surface of the curved mirror. The diffusion layer may be mechanically moved relative to the user's eye to enable light to pass through transparent regions in the diffusion layer in a time multiplexed fashion. The glasses system may also include a mirror stack to enable different virtual images to be formed at different depths.

20 Claims, 10 Drawing Sheets

(52) U.S. Cl.
CPC ............ *G02B 26/023* (2013.01); *G02B 27/28* (2013.01); *H04N 9/3173* (2013.01); *G02B 2027/0178* (2013.01); *H04N 9/3129* (2013.01)

(58) Field of Classification Search
CPC .............. G02B 2027/0178; G02B 5/02; H04N 9/3173; H04N 9/3129; G02F 1/133504
USPC .......................................................... 359/599
See application file for complete search history.

(56) References Cited

OTHER PUBLICATIONS

Yeom et al., "Reflection-type integral imaging system using a diffuser holographic optical element," Opt. Express 22, 2014, pp. 29617-29626.

Cakmakci et al., "A Compact Optical See-through Head-Worn Display with Occlusion Support," Proceedings of the Third IEEE and ACM International Symposium on Mixed and Augmented Reality (ISMAR 2004), 2004, pp. 1-10.

Hu et al., "High-resolution optical see-through multi-focalplane head-mounted display using freeform optics," Optics Express, vol. 22, No. 11, Jun. 2014, pp. 13896-13903.

Park et al., "Lamina 3D display: projection-type depth-fused display using polarization-encoded depth information," Optics Express, vol. 22, No. 21, Oct. 2014, pp. 26162-26172.

Liu et al.,"A Novel Prototype for an Optical See-Through Head-Mounted Display with Addressable Focus Cues," IEEE Transactions on Visualization and Computer Graphics, vol. 16, No. 3, May/Jun. 2010, pp. 381-393.

Hua et al., "A 3D integral imaging optical see-through headmounted display," Optics Express, vol. 22, No. 11, Jun. 2014, pp. 13484-13491.

* cited by examiner

CATADIOPTRIC ON-AXIS VIRTUAL/AUGMENTED REALITY GLASSES SYSTEM AND METHOD

CROSS-REFERENCE TO RELATED APPLICATIONS

This application claims the benefit of U.S. Provisional Application No. 62/292,805, filed Feb. 8, 2016, the entire contents of which is incorporated herein by reference.

FIELD OF THE INVENTION

The present invention relates to display technology, and more particularly to virtual/augmented reality glasses systems.

BACKGROUND

Virtual reality (e.g., Oculus® Rift, etc.) and/or augmented reality (e.g., Google® Glass, etc.) head mounted displays (HMDs) are gaining popularity in the consumer marketplace. This technology has also been adapted in many professional applications, such as being implemented in training simulators or targeting systems. The primary goal of these devices is to provide visual information to a user wearing a headset, where the visual information appears as natural as possible. Such headsets aim to preserve good optical qualities such as image sharpness, expansive Field-of-View (FOV), accurate color reproduction, high refresh rates, and low latency. Current techniques for implementing such devices include: (1) utilizing a beam-splitter to present off-axis visual information as being received from an on-axis orientation; (2) utilizing freeform optics that leverage complex, aspheric surfaces implemented inside a prism to unify the functions of separate relay, magnification, and combining of a virtual image; and (3) utilizing a direct-view, near-eye display such as a display implemented as a contact lens that includes polarization-selective filters and a microlens array.

However, these current techniques have some deficiencies. The first major challenge is relaying an off-axis optical path to be received at the eye from an on-axis orientation. The various solutions to this challenge introduce distortions (e.g., geometric distortions, chromatic aberrations, replicated images due to diffraction, large spatial variation of optical performance, etc.), are limited to a small FOV that is different from the FOV of a human eye, do not support color information, lead to complex light engines for supporting accommodation cues, lead to eye aperture, size-dependent complex image formation techniques, and are restricted to a small eye box that enables a user to perceive the display. A more robust design is desired to correct or mitigate one or more of these deficiencies.

SUMMARY

A method and system for operating a catadioptric glasses system is presented. The method includes the steps of generating an image via a light engine included in a glasses system and projecting the image onto a display that includes a diffusion layer positioned between a curved mirror and a user's retina. Light emitted from a surface of the diffusion layer is reflected off the curved mirror to the user's retina through the diffusion layer, and the diffusion layer is located between a focal point of the curved mirror and a surface of the curved mirror. The diffusion layer may be mechanically moved relative to the user's eye to enable light to pass through transparent regions in the diffusion layer in a time multiplexed fashion. The glasses system may also include a mirror stack to enable different virtual images to be formed at different depths.

DETAILED DESCRIPTION

A catadioptric system utilizes both refraction and reflection to focus light in an optical system. A catadioptric head mounted display (HMD) utilizes one or more lenses to focus a beam of light from an off-axis projector onto a diffusion layer and one or more curved mirrors to reflect light from the diffusion layer onto a user's retina from an on-axis orientation. Various embodiments of the diffusion layer enable light reflected off the curved mirror to pass through the diffusion layer and reach the user's retina. The curved mirror may also be translucent or transparent in a range of wavelengths or polarizations that enable the user to see through, at least partially, both the diffusion layer and the curved mirror such that the HMD can be utilized in an augmented reality application.

Figure 1:
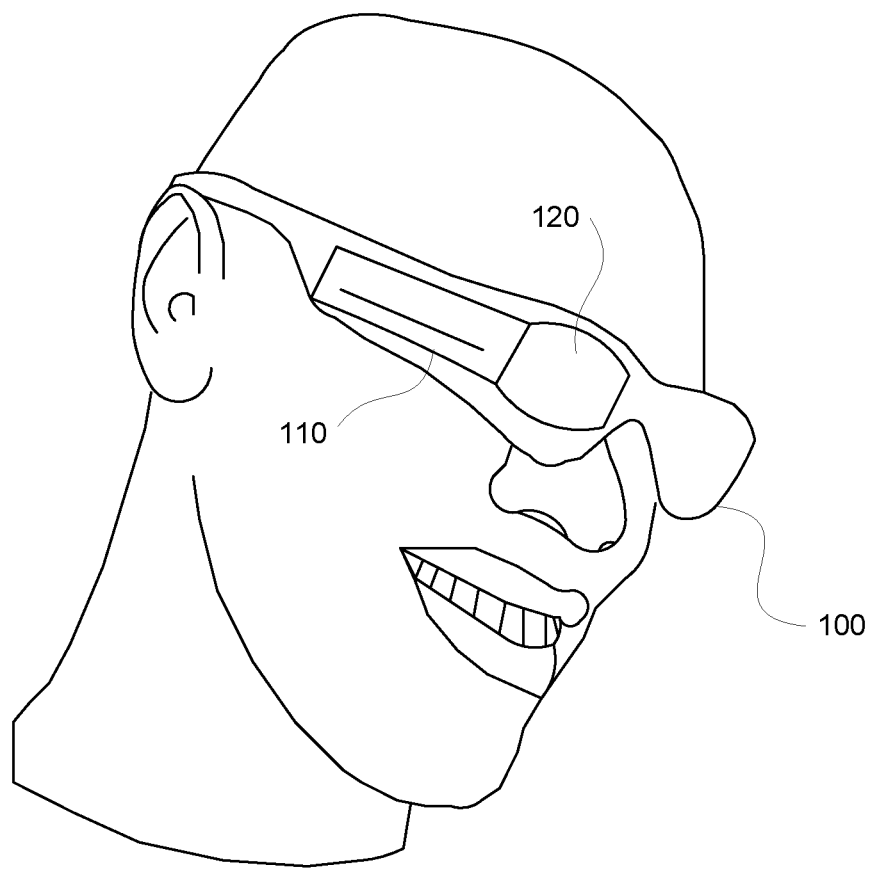
FIG. 1 illustrates a head mounted display, in accordance with one embodiment.

FIG. 1 illustrates a head mounted display 100, in accordance with one embodiment. The HMD 100 includes a light engine 110 and a display 120. The light engine 110 is configured to multiplex and modulate light to project visual information to the display 120. The display 120 includes a diffuser that is at least partially see-through. The display 120 also includes a curved mirror that reflects light from the diffuser to relay the light back to a user's retina.

In one embodiment, the light engine 110 projects light onto the diffuser from an off-axis orientation. As shown in FIG. 1, the light engine 110 may be placed on the side of the user's head by fixing the light engine 110 to a frame of the HMD 100. The light engine 100 includes a projector and one or more lenses capable of projecting an image onto a surface of the diffuser. The light engine 110 is configured to modulate at least one of a polarization of light, a wavelength (color) of light, and a focus of light projected onto a surface of the diffuser.

In one embodiment, the light engine 110 includes a processor and a memory. Images, in the form of a sequence of image frames to be projected onto the diffuser, may be received by the light engine 110 and stored in the memory. The images may be processed by the processor to generate control signals for operating the projector. The light engine 110 may also include a communications interface, either wired or wireless, for receiving the images. For example, the images may be received via a Bluetooth or WiFi interface, or the images may be received via a USB interface and stored in the memory.

In one embodiment, the HMD 100 is a monocular display in that a light engine 110 and display 120 project visual information into a single eye of the user. In another embodiment, the HMD 100 is a binocular display in that the HMD 100 includes a pair of light engines 110 and corresponding displays 120 for each of the user's eyes.

Figure 2:
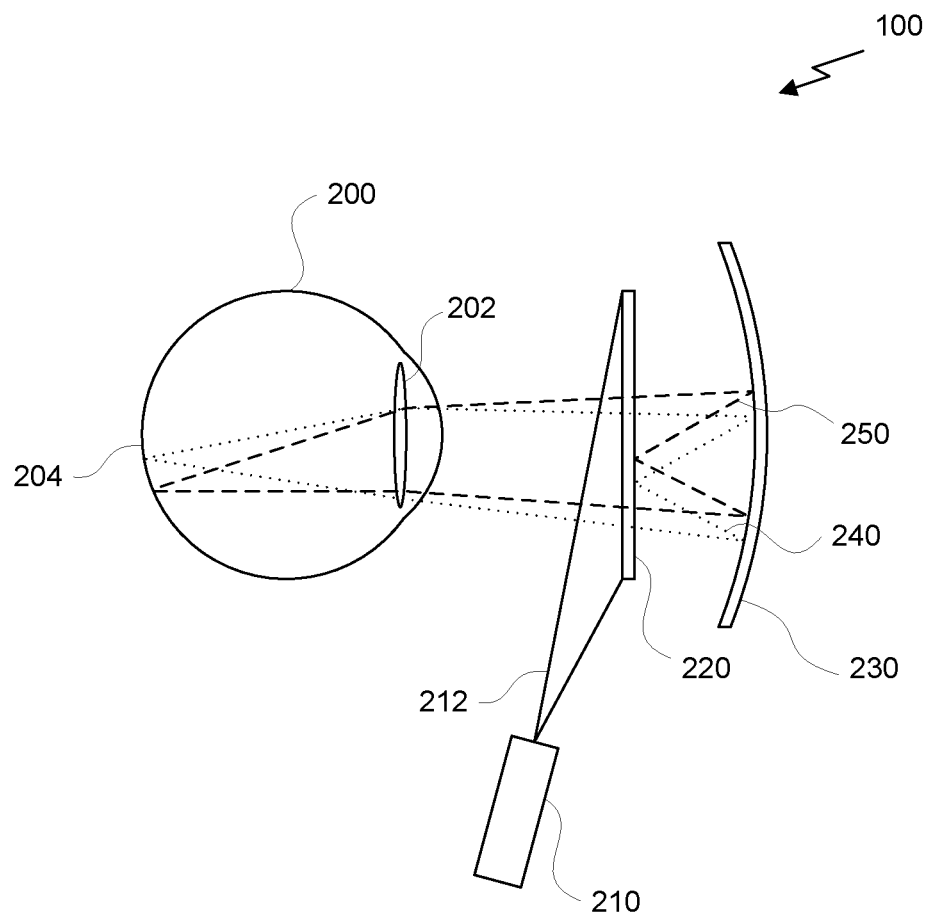
FIG. 2 illustrates the operation the head mounted display, in accordance with one embodiment.

FIG. 2 illustrates the operation the HMD 100, in accordance with one embodiment. As shown in FIG. 2, the HMD 100 includes a projector 210 (included in the light engine 110) that projects light 212 forming an image on a surface of a diffuser 220. The light is diffused through the diffuser 220 such that the front surface (i.e., the side furthest from a user's eye 200) of the diffuser 220 is illuminated with the image projected by the projector 210. The image is reflected off a curved mirror 230 back through the diffuser 220 to be directed at the user's eye 200. The light reflected by the curved mirror 230 passes through the lens 202 of the eye and strikes the user's retina 204. Light paths 240 and 250 illustrate how the curved mirror 230 reflects light from particular points on the surface of the diffuser 220 back to corresponding locations on the retina 204.

In one embodiment, the curved mirror 230 is at least partially transparent to enable the HMD 100 to be utilized in an augmented reality environment. The curved mirror 230 may be designed to only reflect a portion of light from the diffuser 220 back to the user and allow a portion of light from beyond the curved mirror 230 to pass through the curved mirror 230 to reach the user's eye. Consequently, the curved mirror 230 enables a user to combine visual information from the front surface of the diffuser 220 with visual information from the environment beyond the curved mirror 230. As used herein, the front surface of the diffuser 220 refers to the surface proximate the curved mirror 230 and the rear surface of the diffuser 220 refers to the surface proximate the user's eye 200. In some embodiments, the curved mirror 230 may be replaced with any equivalent optical structure that enables some light to pass through the structure from the environment beyond the optical structure and reflects at least some light from the diffuser 220 back towards the user's eye 200.

It will be appreciated that the curvature of the curved mirror 230 may be adapted to change the perceived depth of the virtual image reflected back to the user's eye 200. The image is a virtual image when the front surface of the diffuser 220 is located between the focal point of the curved mirror 230 and the surface of the curved mirror 230. The location of the diffuser 220 relative to the focal point and the radius of curvature of the curved mirror 230 may also be adjusted to change a magnification of the virtual image compared to the image formed on the front surface of the diffuser 220 as well as to change a perceived depth of the virtual image. Some prior art displays have been adapted with diffusers and microlens mirror arrays to project an image to a viewer. However, the focal point of each lens in the microlens array is located closer to the lens than the diffuser, such that the image seen by the viewer does not appear to be a virtual image further from the viewer than the display. Consequently, this type of technology is not suitable for near eye displays such as the HMD 100 because the image formed would be outside of the accommodation range of the user's eye. In contrast, a single curved mirror 230 rather than a microlens array enables the diffuser 220 to be placed at a location at which formation of a virtual image at a position beyond the front surface of the curved mirror 230 is optimal for near eye displays.

The diffuser 220 is partially transparent to allow light reflected off the curved mirror 230 to pass through the diffuser 220 on the way to the eye 200. In one embodiment, the diffuser 220 is manufactured as a transparent sheet overlaid on a light diffuser film, where portions of the light diffuser film have been removed to form a grid of alternating translucent and transparent regions. The transparent sheet may be rigid, such as a polycarbonate resin or other polymer with see-through properties. In another embodiment, the diffuser 220 may include a liquid crystal material. The diffuser 220 allows light to pass through the transparent regions while light from the projector 210 that strikes the front side of the diffuser 220 is diffused throughout the translucent regions. Consequently, the translucent regions can act as point light sources for a blurred portion of the image projected onto the front side of the diffuser 220 by the projector 210.

Figure 3A:
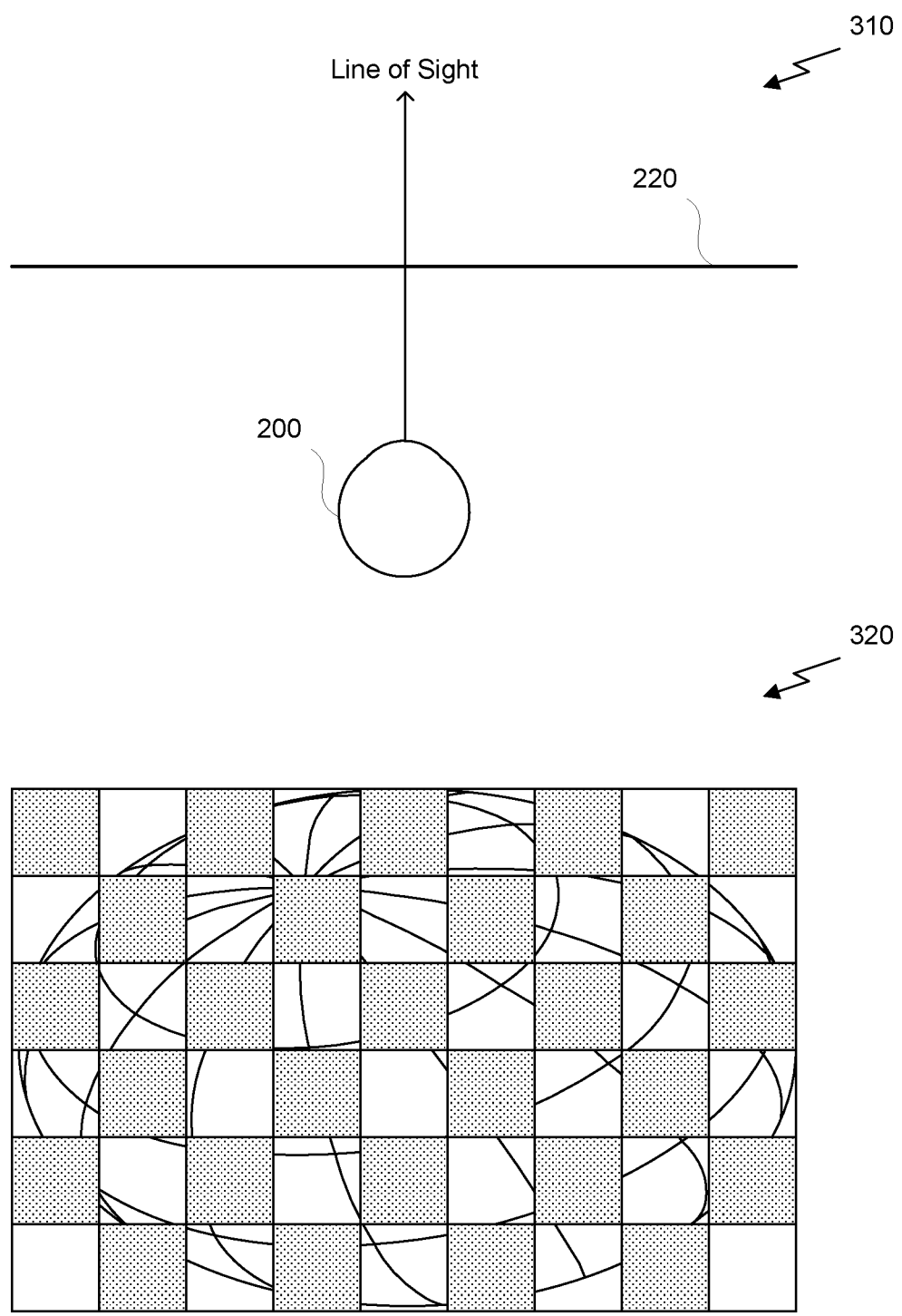
FIGS. 3A through 3C illustrate the operation of a rotating diffuser, in accordance with one embodiment.
Figure 3B:
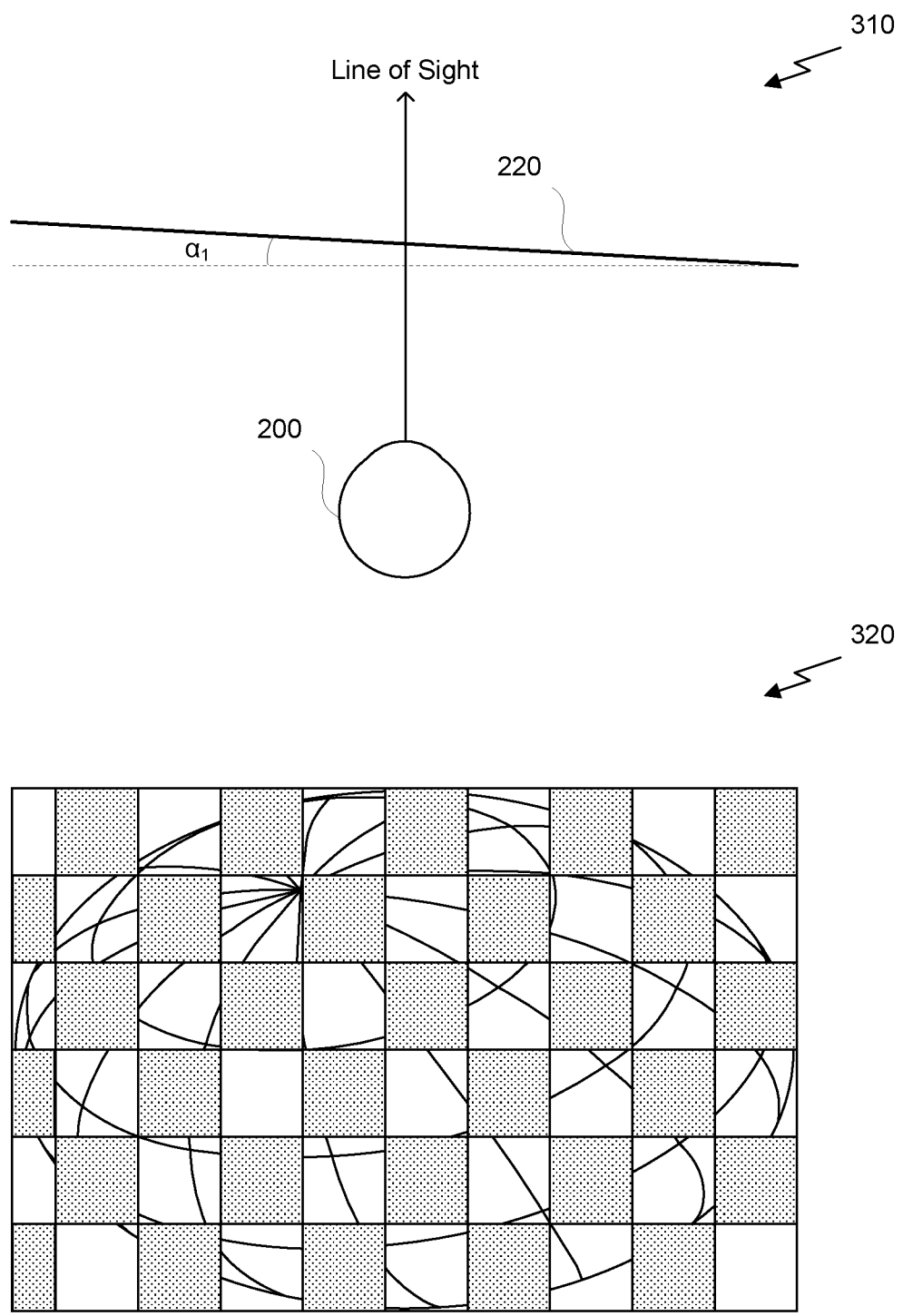
Figure 3C:
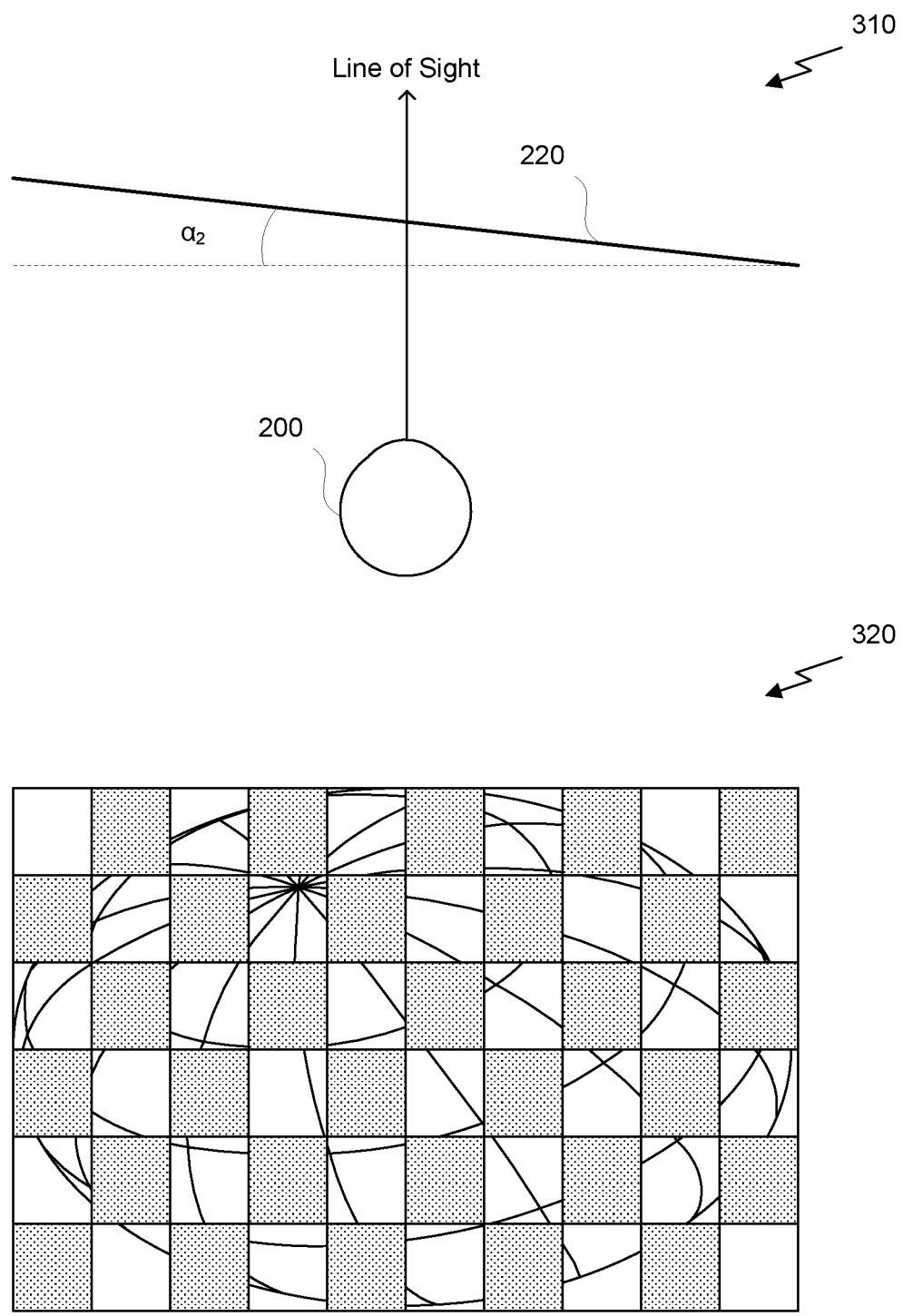

FIGS. 3A through 3C illustrate the operation of a rotating diffuser 220, in accordance with one embodiment. As shown in FIG. 3A, the diffuser 220 may be positioned perpendicular to a line of sight from a user's eye. A top view 310 of the diffuser 220 shows the orientation of the diffuser 220 to the line of sight. A magnified front view 320 of the diffuser 220, illustrates the grid of alternating translucent and transparent regions of the diffuser 220. A wireframe drawing of a sphere can be seen through the transparent regions of the diffuser 220, while the translucent regions at least partially obscure the wireframe drawing of the sphere.

The resolution of the grid is small enough such that a user may not be able to resolve individual cells of the grid when the diffuser 220 is positioned close to the eye 200. This is especially true when the user's focus is directed to a point far beyond the surface of the curved mirror 230. In effect, the user simultaneously perceives a low-resolution view of the translucent regions of the diffuser 220 (possibly out of focus) along with a low-resolution view of the environment beyond the diffuser 220. The result is that a user will combine the visual information from the translucent environment on the front surface of the diffuser 220, albeit potentially out of focus, visual information from the back surface of the diffuser 220, reflected off the curved mirror 230, and the visual information from the environment beyond the curved mirror 230. As used herein, "the environment beyond the curved mirror 230" refers to the environment located in space a distance further away from the user's eye 200 than the reflective surface of the curved mirror 230.

In one embodiment, the diffuser 220 may be located outside the accommodation range of a user's eye. In other words, the diffuser 220 may be located at a position close enough to the eye 200 that the user cannot bring the front surface of the diffuser 220 into focus. This is desired because, ideally, the goal is to augment a virtual image of the front surface of the diffuser 220, as reflected off the curved mirror 230, located at a perceived depth that is proximate to the point of focus of the user in the environment beyond the curved mirror 230. In other words, the goal is to allow the user's eye to focus at a particular depth that keeps both the virtual image from the display and objects in the environment beyond the curved mirror 230 in focus at the same time. This prevents fatigue as the user's eye 200 is not straining to resolve objects at two different depths.

Still, if the location of the diffuser 220 is static, any visual information from the external environment obscured by the translucent regions of the diffuser 220 will not reach the user's eye (or will at least be blurred as the visual information is diffused throughout the translucent region). As an example, the view of the sphere in the front view 320 of FIG. 3A shows the translucent regions of the diffuser 220 as obscuring approximately half of the sphere. Since the HMD 100 is a wearable device, the natural motion of the user's head is likely to change the view of the sphere that passes through the transparent regions of the diffuser 220. However, additional steps can be implemented to reduce the amount of visual information that is obscured by the translucent regions of the diffuser 220.

In one embodiment, the diffuser 220 may be dynamically moved relative to the user's eye 200 in order to change the visual information that reaches the eye 200 through the transparent regions of the diffuser 220. As shown in the top view 310 of FIG. 3B, the diffuser 220 may be rotated around an axis offset from the line of sight such that the horizontal projection of the each of the cells of the grid in the diffuser 220 is not perpendicular to the line of sight. The diffuser 220 is rotated relative to a plane perpendicular to the line of sight by an angle $\alpha_1$. As shown in the front view 320 of FIG. 3B, the location and projection of the grid has changed relative to the user's eye 200, enabling different visual information from the external environment to reach the user's eye 200 through the transparent regions of the diffuser 220. As shown in the top view 310 of FIG. 3C, the diffuser 220 may continue rotating around the axis such that the angle between the diffuser 220 and the plane perpendicular to the line of sight is increased to an angle $\alpha_2$. Again, as shown in the front view 320 of FIG. 3C, the location and projection of the grid has once again changed relative to the user's eye 200.

In operation, the orientation of the diffuser 220 relative to the line of sight may be cycled between a range of angles such that the relative location of the transparent regions of the diffuser are continuously moving. The cycling rate of the orientation throughout the range of angles may be fast enough that the user perceives a full picture of the visual information from the external environment as the visual information is accumulated on the retina. The cycling rate may be fast enough that the user cannot perceive the small change in orientation of the diffuser 220 and the diffuser simply appears transparent to the user.

In another embodiment, the diffuser 220 may be rotated around a horizontal axis such that the grid shifts and the projection changes in a vertical direction. In yet another embodiment, the diffuser 220 may be shifted in a horizontal direction or vertical direction along the plane perpendicular to the line of sight such that the projection of the grid on the retina is not compressed in any one direction, but the relative location of the grid is moved relative to the retina. For example, the diffuser 220 may be shifted to the left by an amount equal to the width of one cell of the grid, and then shifted back to the right by an equal amount. The shifting can be accomplished by a piezo-electric device that operates at a high frequency.

In one embodiment, the projector 210 is synchronized with the motion of the diffuser 220. For example, the projector may be configured to project an image onto the diffuser 220 when the diffuser is approximately perpendicular to the line of sight. However, as the diffuser 220 is moved such that the angle between a normal of the surface of the diffuser 220 and the line of sight increases above a threshold angle, the projector 210 will block the light 212 from being projected onto the surface of the diffuser 220. In one embodiment, the projector may include a liquid crystal element and a polarizer filter that enables the projector to attenuate the light through the liquid crystal element. The liquid crystal element can then be synchronized with the angle of the diffuser to only allow light 212 to be projected onto the surface of the diffuser 220 when the angle is within a certain range.

It will be appreciated that the layout of the grid is only one exemplary layout, and that, in other embodiments, the layout of the grid may be different than an alternating 2D pattern shown in FIGS. 3A through 3C. In one embodiment, the grid remains the same, but the ratio of translucent regions to transparent regions is different such that there are many more transparent regions that fully surround translucent regions. In another embodiment, the shape of translucent regions may be circular and arranged in a 2D grid over a transparent field. In yet another embodiment, the grid may be an a periodic structure that, when combined with the motion of the diffuser 220, scans across a plane to form a full translucent region in a time multiplexed fashion.

Figure 4:
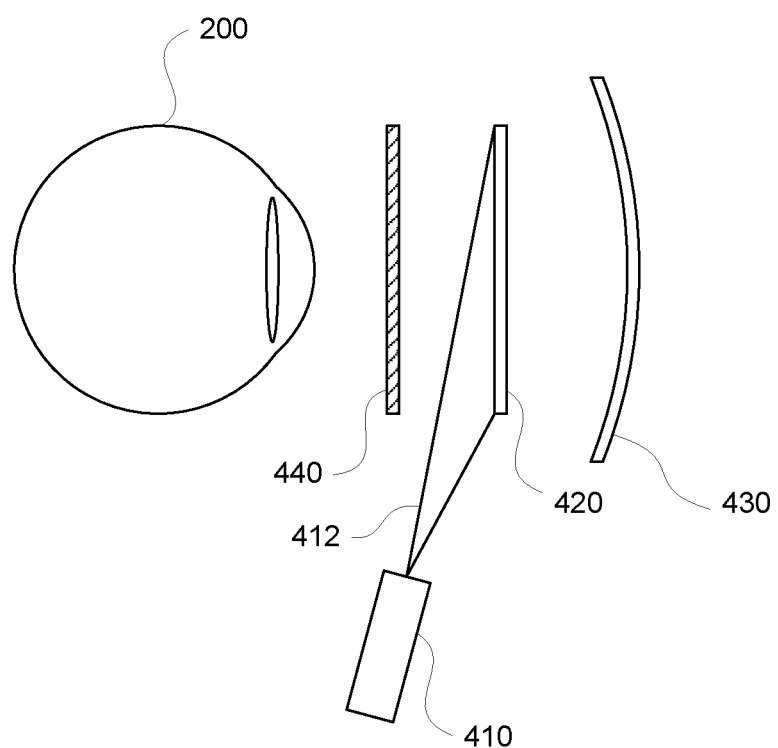
FIG. 4 illustrates the operation of the head mounted display, in accordance with another embodiment.

FIG. 4 illustrates the operation of the HMD 100, in accordance with another embodiment. As shown in FIG. 4, the HMD 100 includes a projector 410 (included in the light engine 110) that projects polarized light 412 on a polarization-selective scatterer 420, thereby forming an image on a front surface of the scatterer 420. The scatterer 420 is a form of diffuser that only diffuses light polarized at a specific orientation, or within a small band of orientations (e.g., +/−5 degrees of vertical polarization). Light polarized at other orientations passes through the scatterer 420 as if the scatterer 420 was transparent. In one embodiment, the scatterer 420 comprises liquid crystal elements stretched along one axis to diffuse light along the long axis that has a polarization.

The scatterer 420 is illuminated with the light 412 projected by the projector 410, the projector 410 is configured to polarize the light 412 such that the light is diffused by the scatterer 420, thereby forming an image on the front surface of the scatterer 420 that is proximate the reflective surface of a curved mirror 430. The image is then reflected off the curved mirror 430 and reflected back through the scatterer 420 to be directed at the user's eye 200. The curved mirror 430 may include a surface treatment that changes the polarization of the light reflected off the curved mirror 430 such that the light, passing back through the scatterer 420 is not diffused and passes directly back towards the eye 200. The light reflected by the curved mirror 430 passes through a polarizer 440. The polarizer 440 is located between the scatterer 420 and the eye 200 such that light reflected or emitted from the front surface of the scatterer 420 does not reach the eye 200 directly (i.e., only the light of different polarization after being reflected off the curved mirror 430 will pass through the polarizer 440 to reach the user's eye 200). Again, the scatterer 420 may be located at a distance from the surface of the curved mirror that is between the focal point of the curved mirror 430 and a surface of the curved mirror 430. Consequently, the only visual information that reaches the eye 200 should be visual information reflected off the curved mirror 430 and visual information from the external environment that passes through the curved mirror 430.

In one embodiment, the surface treatment on the curved mirror 430 comprises a wave retarder film affixed to the surface of the curved mirror 430. In another embodiment, the surface treatment may be omitted in lieu of a Quarter-Wave Plate placed between the scatterer 420 and the curved mirror 430. In this case, the Quarter-Wave Plate changes the polarization of light as the light passes through the Quarter-Wave Plate from linear polarized light to circular polarized light, which is then reflected off the surface of the curved mirror 430 and passes back through the Quarter-Wave Plate to change the circular polarized light back to linear polarized light having an orientation 90 degrees relative to the orientation of the light emitted from the diffuser 420.

The polarization selective scatterer 420 does not need to be rotated like the diffuser 220 in FIG. 2 because the surface of the scatterer 420 is uniform and there is no difference between different regions of the scatterer 420. Again, light polarized off axis relative to the polarization of the scatterer 420 will pass through the scatterer 420 towards the eye without being diffused, whereas light 412 from the projector 410, polarized at a particular polarization to match a characteristic of the scatterer 420, will be diffused, forming an image on the front surface of the scatterer 420 that is reflected back to the eye 200 at a different polarization. It will be appreciated that the polarization-selective scatterer 420 is not an ideal component. In other words, the scatterer 420 will diffuse some horizontally polarized light as well as vertically polarized light, although the diffusion of the horizontally polarized light may be much less than the diffusion of the vertically polarized light.

Figure 5:
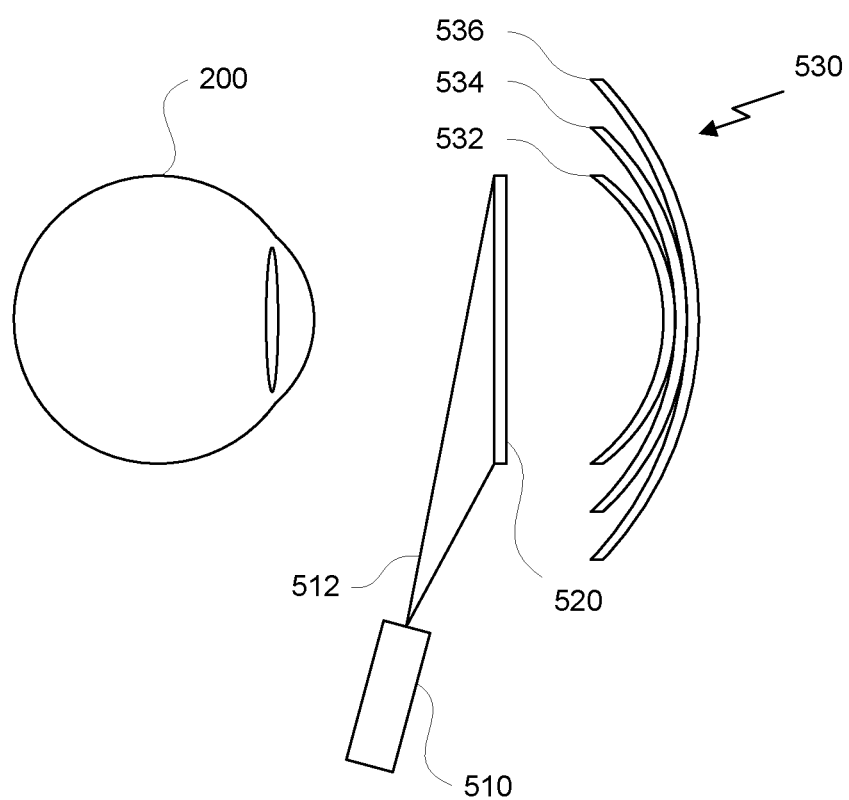
FIG. 5 illustrates the operation of the head mounted display, in accordance with yet another embodiment.

FIG. 5 illustrates the operation of the HMD 100, in accordance with yet another embodiment. As shown in FIG. 5, the HMD 100 includes a projector 510 (included in the light engine 110) that projects polarized light 512 towards a diffuser 520, forming an image on a front surface of the diffuser 520, similar to the technique described above corresponding to the diffuser 220 of FIGS. 2 and 3A through 3C. However, instead of a single curved mirror 230, the HMD 100 includes a stack 530 of a plurality of curved mirrors. Each curved mirror in the stack 530 has a different radius of curvature, such that the magnification and perceived depth of the virtual image is different for each mirror. Each mirror, such as mirror 532, mirror 534, and mirror 536, selectively reflects light of a specific wavelength or polarization, or within a small band of wavelengths or polarizations. Again, the diffuser 520 may be located at a distance from the surface of each curved mirror in the stack 530 that is between the focal point of the curved mirror and a surface of the curved mirror.

For example, mirror 532 may reflect light of wavelengths corresponding to a first color band, mirror 534 may reflect light of wavelengths corresponding to a second color band, and mirror 536 may reflect light of wavelengths corresponding to a third color band. The projector 510 may then project light 512 to form an image with light in each of the three color bands. The portion of the image corresponding to light in the first color band will be reflected by mirror 532 in a virtual image at a first perceived depth, the portion of the image corresponding to light in the second color band will be reflected by mirror 534 in a virtual image at a second perceived depth, and the portion of the image corresponding to light in the third color band will be reflected by mirror 536 in a virtual image at a third perceived depth. The light engine 110 may then process images to generate light 512 of a certain wavelength to create a virtual image that is perceived by a user at a particular depth. In addition, the image processing may combine images of different wavelengths into a single, multi-color image projected onto the diffuser 520 to produce virtual images perceived by a user at different depths.

In a different embodiment, the diffuser 520 may be replaced by sets of polarization scatterers 420 and corresponding polarizers 440 corresponding to the different mirrors in the stack 530 of curved mirrors. In such an embodiment, the mirrors may selectively reflect light of different polarizations. Consequently, the light engine 110 may be configured to generate images of particular polarization to create virtual images perceived by a user at different depths. The projector 510 may be configured to display the images at different polarizations in a time division multiplexed manner, such that light 512 of a first polarization is projected to form a first image on a corresponding scatterer 420 during a first time period, light 512 of a second polarization is projected to form a second image on a different scatterer 420 during a second time period, and so forth. The time periods may be of short duration such that a number of different images are projected at a frequency where the images are perceived as combined to a user (e.g., cycling the images such that a full cycle of a plurality of images of different polarizations are projected at a frame rate of 30 Hz or greater).

In one embodiment, the HMD 100 may be a varifocal display. By moving the diffuser 220 and the curved mirror 230 closer to or further from the eye 200, the focal plane of the virtual image will move relative to the eye 200. Consequently, the diffuser 220 and curved mirror 230 can be actuated to move along the line of sight to accommodate various focal planes in a dynamic fashion. Varifocal displays are particularly useful in augmented reality displays because the object of a user's focus may be at various distances from the user, and varying the focal plane of the virtual image to be at a proximate distance of a particular object makes using augmented reality displays more comfortable as the user is not trying to focus at two vastly different distances. It will be appreciated that the scatterer 420 and curved mirror 430 as well as the diffuser 520 and stack 530 may be moved in a similar fashion to the diffuser 220 and curved mirror 230.

Figure 6:
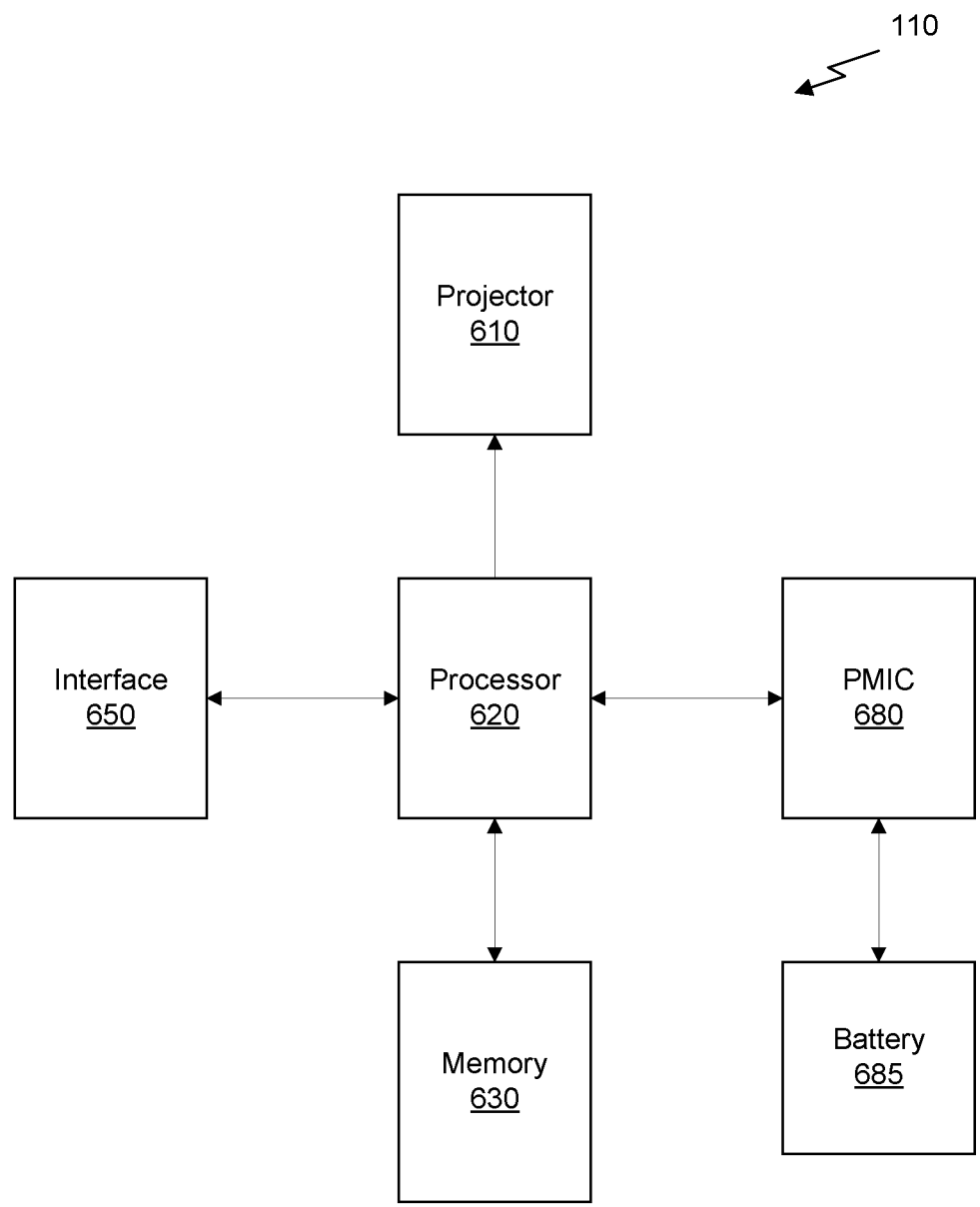
FIG. 6 illustrates a light engine of the glasses system, in accordance with one embodiment.

FIG. 6 illustrates a light engine 110 of the glasses system 100, in accordance with one embodiment. Again, the light engine 110 includes electronics for generating images to project onto the display 120, and a projector to modulate a light source (included in the projector) to project those images onto a diffusion layer of the display 120. In one embodiment, the light engine 110 includes a projector 610, a processor 620, a memory 630, an interface 650, a power management integrated circuit (PMIC) 680, and a battery 685. The projector 610 may be projector 210, projector 410, or projector 510 of FIGS. 2, 4, and 5. The processor 620 and memory 630 may be implemented in a single package configuration (e.g., package-on-package (POP)) and affixed via solder to a printed circuit board (PCB) that includes the interface 650 and PMIC 680 affixed thereto. The battery 685 may be a lithium ion battery, which may be recharged using the PMIC 680 when the glasses system 100 is connected to an external power source. Alternatively, the battery 685 may be a disposable coin-type battery that can be replaced when the battery 685 is drained of charge.

In one embodiment, the interface 650 comprises a controller that implements a wireless communications standard such as IEEE 802.15 (i.e., Bluetooth) or IEEE 802.11 (i.e., Wi-Fi). The controller may include one or more transceivers and an antenna array consisting of one or more antennas for transmitting or receiving data via wireless channels. The controller may also include an on-chip memory for storing data received from the processor 620 for transmission over the wireless channels or data to be transmitted to the processor 620 received over the wireless channels. In another embodiment, the interface 650 comprises a controller that implements a wired communications standard such as a USB interface. The interface 650 may include a physical interface for plugging a cable into the glasses system 100 as well as a controller for managing communications over the communications channel(s).

In one embodiment, the processor 620 receives image data to be displayed on the glasses system 100 via the channels connected to the interface 650. The image data may be stored in the memory 630. The processor 620 may also implement algorithms for modifying the image data in the memory 630. For example, the processor 620 may warp the image data based on parameters stored in the memory 630 that map the image data to a user's retina based on characteristics of the display and/or a user's eye. For example, the parameters may enable image data to be warped to correct for aberrations in the optical components of the display 120. Alternatively, the parameters may enable image data to be warped to accommodate a corrective lens prescription for a user so that the display can be seen without corrective lenses. In another embodiment, the processor 620 receives instructions and/or data and is configured to generate image data for display. For example, the processor 620 may receive 3D geometric primitive data to be rendered based on the instructions to generate the image data in the memory 630.

The image data may then be transmitted to the projector 610, which modulates a light source to project light to the display 120. In one embodiment, the projector may include a white light source positioned behind one or more lenses, light modulating elements (e.g., liquid crystal panels, microelectromechanical scanners (MEMS), or digital micromirror devices (DMD)), color filter arrays, and polarizing filters. The projector 610 is configured to modulate at least one of a polarization of light, a wavelength of light, and/or a focus of light projected onto a surface of the diffusion layer by controlling the various elements enumerated above. The light is projected to form an image on a surface of the diffusion layer of the display 120.

It will be appreciated that the light engine 110 described and shown in FIG. 6 is only one such example of the light engine 110. Other embodiments of the light engine 110 are contemplated as being within the scope of the present disclosure, including but not limited to different light modulating technology such as laser projection; an application specific integrated circuit (ASIC) that includes the processor 620, memory 630, PMIC 680, and/or interface 650 on a single die; and a more complex system with multiple processors (e.g., CPU and GPU) as well as other components in addition to or in lieu of the components shown in FIG. 7.

Figure 7:
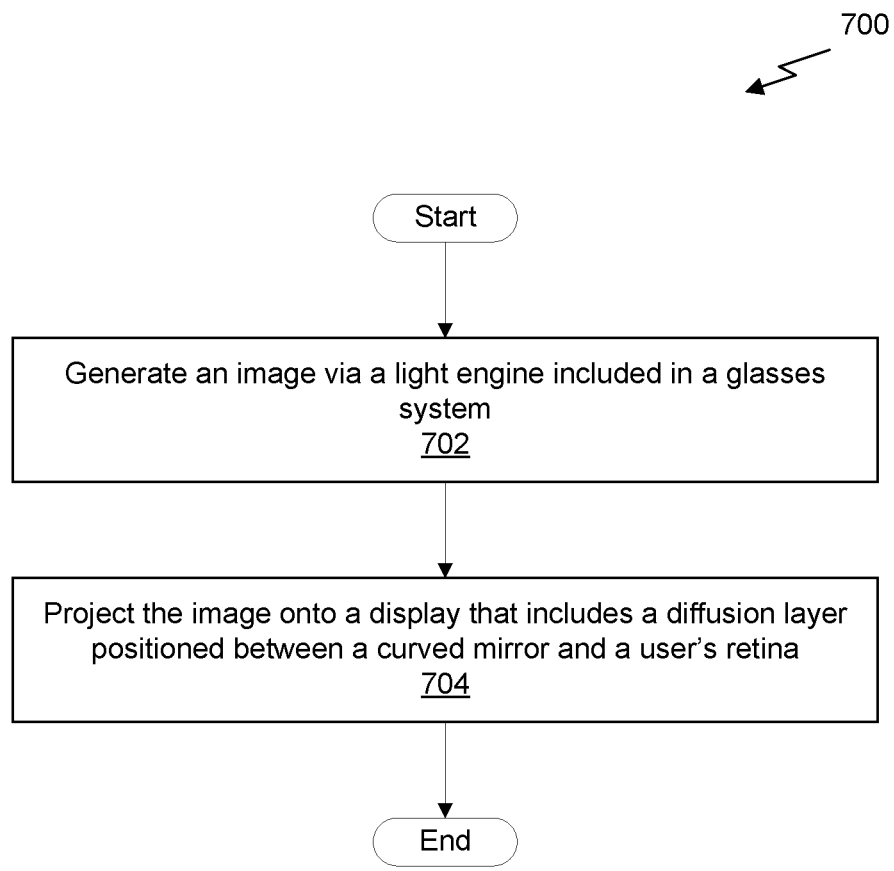
FIG. 7 illustrates a flowchart of a method for operating the glasses system, in accordance with one embodiment.

FIG. 7 illustrates a flowchart of a method 700 for operating the glasses system 100, in accordance with one embodiment. It will be appreciated that at least some steps of the method 700 are described within the scope of software executed by a processor; however, in some embodiments, portions of the method 700 may be implemented in hardware or some combination of hardware and software.

The method 700 begins at step 702, where a light engine 110 included in the glasses system 100 generates an image. In one embodiment, the light engine 110 receives image data from a communications channel and stores the image data in a memory. A processor in the light engine 110 may be configured to process the image data prior to display, such as by warping the image data to form image data for a corresponding warped image. In another embodiment, the light engine 110 implements a program (i.e., a set of instructions) that renders the image data from source data, such as a stream of geometric primitives associated with a 3D model.

At step 704, the image is projected onto a display that includes a diffusion layer positioned between a curved mirror and a user's retina. In one embodiment, a projector 210 projects light onto a rear surface (i.e., the surface proximate the user's eye) of the diffuser 220, which forms an image on the front surface of the diffuser 220. The image on the front surface of the diffuser 220 is reflected off the surface of the curved mirror and directed back towards the user's retina 204 through the transparent regions of the diffuser 220. The diffuser 220 is dynamically moved relative to a line of sight of the eye 200 such that the image reflected back through the different transparent regions of the diffuser 220 reaches as much of the user's retina 204 as possible, thereby preventing the user from perceiving the occluded portion of the reflected image striking the translucent regions of the diffuser 220. In another embodiment, a projector 410 projects polarized light onto a rear surface of a scatterer 420, which forms an image on the front surface of the scatterer 420. The image on the front surface of the scatterer 420 is reflected off the surface of the curved mirror, passing through a wave retarder film on the surface of the curved mirror, and directed back towards the user's retina 204 through the scatterer 420, which transmits the reflected image of different polarization through a polarizing filter 440 and to the user's eye 200. In yet another embodiment, a projector 510 projects light of one or more wavelengths and/or polarizations onto a diffuser 520, which forms an image on the front surface of the diffuser 520. The image on the front surface of the diffuser 520 is reflected off the surface of one of a plurality of curved mirrors having selective-reflective characteristics based on polarization and/or wavelength and directed back towards the user's retina 204.

Figure 8:
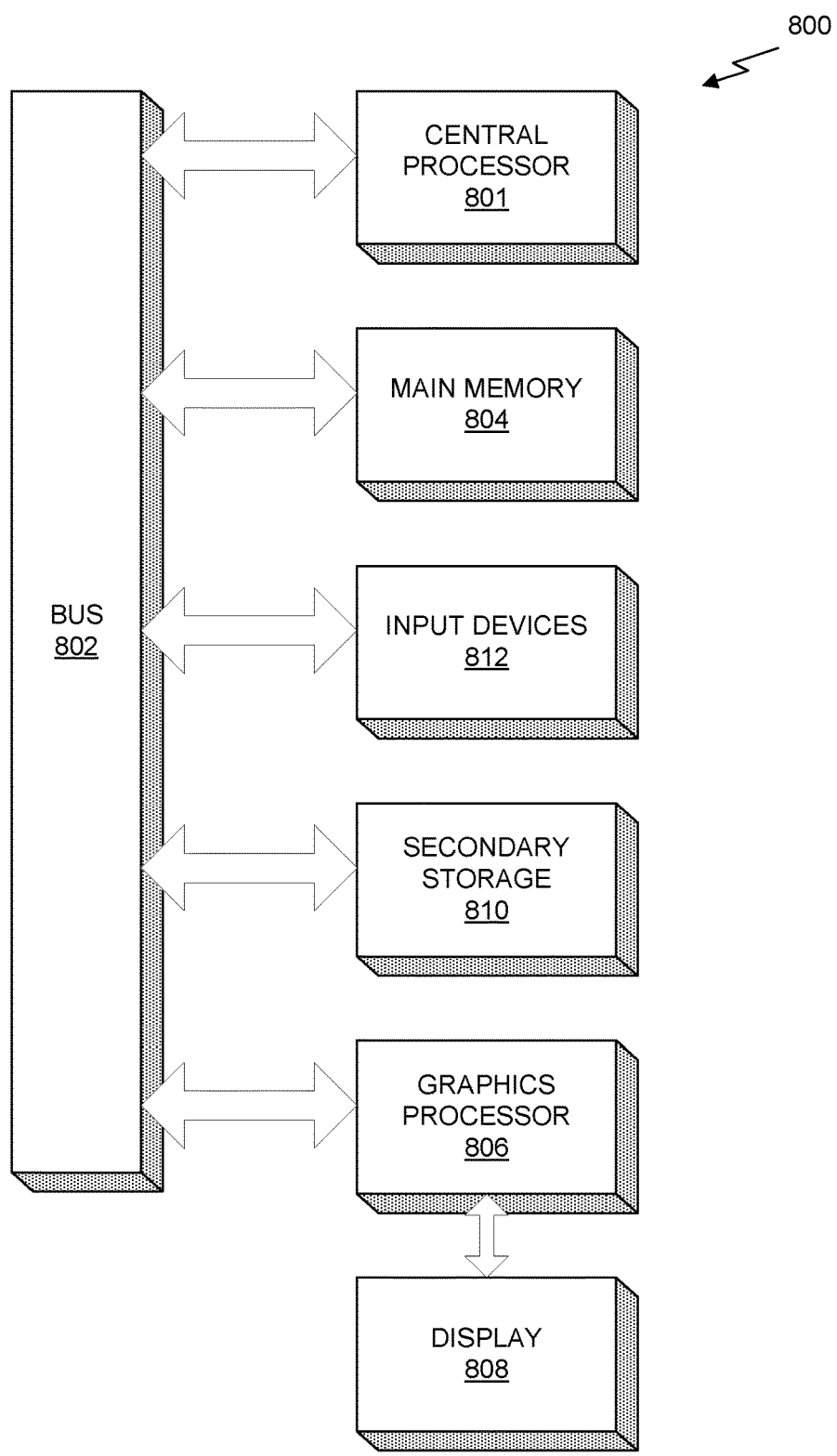
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one central processor 801 that is connected to a communication bus 802. The communication bus 802 may be implemented using any suitable protocol, such as PCI (Peripheral Component Interconnect), PCI-Express, AGP (Accelerated Graphics Port), HyperTransport, or any other bus or point-to-point communication protocol(s). The system 800 also includes a main memory 804. Control logic (software) and data are stored in the main memory 804 which may take the form of random access memory (RAM).

The system 800 also includes input devices 812, a graphics processor 806, and a display 808, i.e. a conventional CRT (cathode ray tube), LCD (liquid crystal display), LED (light emitting diode), plasma display, HMD, or the like. User input may be received from the input devices 812, e.g., keyboard, mouse, touchpad, microphone, and the like. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 804 and/or the secondary storage 810. Such computer programs, when executed, enable the system 800 to perform various functions. The memory 804, the storage 810, and/or any other storage are possible examples of computer-readable media.

In one embodiment, the architecture and/or functionality of the various previous figures may be implemented in the context of the central processor 801, the graphics processor 806, an integrated circuit (not shown) that is capable of at least a portion of the capabilities of both the central processor 801 and the graphics processor 806, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, laptop computer, server, workstation, game consoles, embedded system, and/or any other type of logic. Still yet, the system 800 may take the form of various other devices including, but not limited to a personal digital assistant (PDA) device, a mobile phone device, a television, etc.

Further, while not shown, the system 800 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   generating an image via a light engine included in a glasses system; and
   projecting the image onto a display that includes a diffusion layer positioned between a curved mirror and a user's retina, wherein light emitted from a surface of the diffusion layer is reflected off the curved mirror to the user's retina through the diffusion layer, and wherein the diffusion layer is located between a focal point of the curved mirror and a surface of the curved mirror and the curved mirror is located on-axis along a line of sight associated with the user's retina.

2. The method of claim 1, wherein the light engine is configured to modulate at least one of a polarization of light, a wavelength of light, and/or a focus of light projected onto a surface of the diffusion layer.

3. The method of claim 1, wherein the diffusion layer comprises a polarization-selective scatterer, and wherein the light engine projects the image onto the diffusion layer with light polarized at a polarization corresponding to the polarization-selective scatterer.

4. The method of claim 3, the display further comprising a polarizing filter positioned between the diffusion layer and the user's retina to prevent polarized light projected from the light engine and scattered by the diffusion layer to reach the user's retina without being reflected off the curved mirror.

5. The method of claim 4, wherein the curved mirror includes a wave retarder film on the surface of the curved mirror to alter a polarization of the light reflected off the curved mirror.

6. The method of claim 1, wherein the glasses system includes a stack of a plurality of curved mirrors, each curved mirror in the plurality of curved mirrors having a different radius of curvature.

7. The method of claim 6, wherein each curved mirror in the plurality of curved mirrors selectively reflects light within a narrow band centered on a particular wavelength while enabling light of different wavelengths to be transmitted through the curved mirror.

8. The method of claim 1, wherein the light engine includes:
   a memory for storing the image;
   a processor for generating the image; and
   a projector for modulating a light source to project the image onto a surface of the diffusion layer.

9. A method comprising,
   generating an image via a light engine included in a glasses system; and
   projecting the image onto a display that includes a diffusion layer positioned between a curved mirror and a user's retina, wherein light emitted from a surface of the diffusion layer is reflected off the curved mirror to the user's retina through the diffusion layer, and wherein the diffusion layer is located between a focal point of the curved mirror and a surface of the curved mirror and the diffusion layer comprises a transparent sheet overlaid on a light diffuser film, wherein portions of the light diffuser film have been removed to form translucent and transparent regions in the diffusion layer.

10. The method of claim 9, wherein the diffusion layer is rotated about an axis to enable the light emitted from the surface of the diffusion layer and reflected off the surface of the curved mirror to pass through the transparent regions of the diffusion layer as a relative location of the transparent regions of the diffusion layer to the curved mirror and the user's retina is dynamically adjusted.

11. A glasses system, comprising:
   a display including a diffusion layer positioned between a curved mirror and a user's retina, wherein light emitted from a surface of the diffusion layer is reflected off the curved mirror to the user's retina through the diffusion layer, and wherein the diffusion layer is located between a focal point of the curved mirror and a surface of the curved mirror and the curved mirror is located on-axis along a line of sight associated with the user's retina; and
   a light engine configured to modulate a light source to project an image onto the surface of the diffusion layer.

12. The system of claim 11, wherein the light engine is configured to modulate at least one of a polarization of light, a wavelength of light, and/or a focus of light projected onto a surface of the diffusion layer.

13. The system of claim 11, wherein the diffusion layer comprises a polarization-selective scatterer, and wherein the light engine projects the image onto the diffusion layer with light polarized at a polarization corresponding to the polarization-selective scatterer.

14. The system of claim 13, the display further comprising a polarizing filter positioned between the diffusion layer and the user's retina to prevent polarized light projected from the light engine and scattered by the diffusion layer to reach the user's retina without being reflected off the curved mirror.

15. The system of claim 14, wherein the curved mirror includes a wave retarder film on the surface of the curved mirror to alter a polarization of the light reflected off the curved mirror.

16. The system of claim 11, wherein the glasses system includes a stack of a plurality of curved mirrors, each curved mirror in the plurality of curved mirrors having a different radius of curvature.

17. The system of claim 16, wherein each curved mirror in the plurality of curved mirrors selectively reflects light within a narrow band centered on a particular wavelength while enabling light of different wavelengths to be transmitted through the curved mirror.

18. The system of claim 11, wherein the light engine includes:
 a memory for storing the image;
 a processor for generating the image; and
 a projector for modulating a light source to project the image onto a surface of the diffusion layer.

19. A glasses system, comprising:
 a display including a diffusion layer positioned between a curved mirror and a user's retina, wherein light emitted from a surface of the diffusion layer is reflected off the curved mirror to the user's retina through the diffusion layer, and wherein the diffusion layer is located between a focal point of the curved mirror and a surface of the curved mirror and the diffusion layer comprises a transparent sheet overlaid on a light diffuser film, wherein portions of the light diffuser film have been removed to form a grid of alternating translucent and transparent regions in the diffusion layer; and
 a light engine configured to modulate a light source to project an image onto the surface of the diffusion layer.

20. The system of claim 19, wherein the diffusion layer is rotated about an axis to enable the light emitted from the surface of the diffusion layer and reflected off the surface of the curved mirror to pass through the transparent regions of the diffusion layer as a relative location of the transparent regions of the diffusion layer to the curved mirror and the user's retina is dynamically adjusted.

* * * * *